No. 885,401. PATENTED APR. 21, 1908.
G. F. TADINI.
UNIVERSAL JOINT.
APPLICATION FILED NOV. 18, 1907.
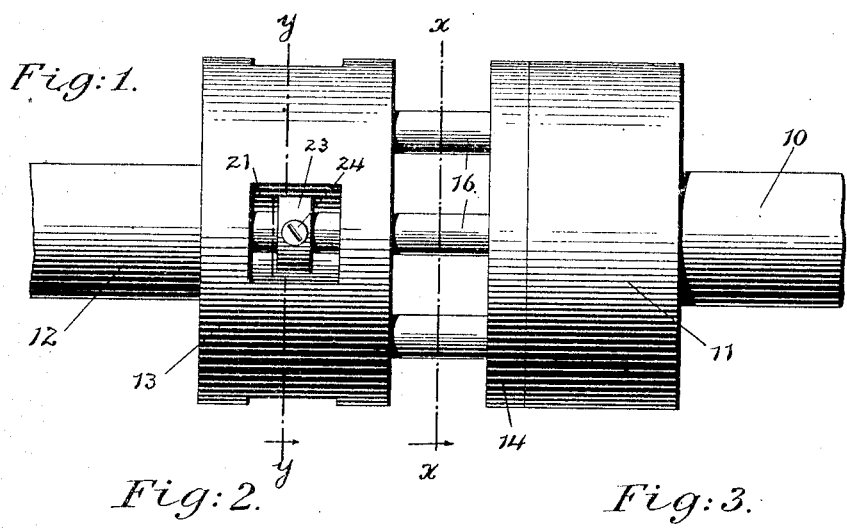
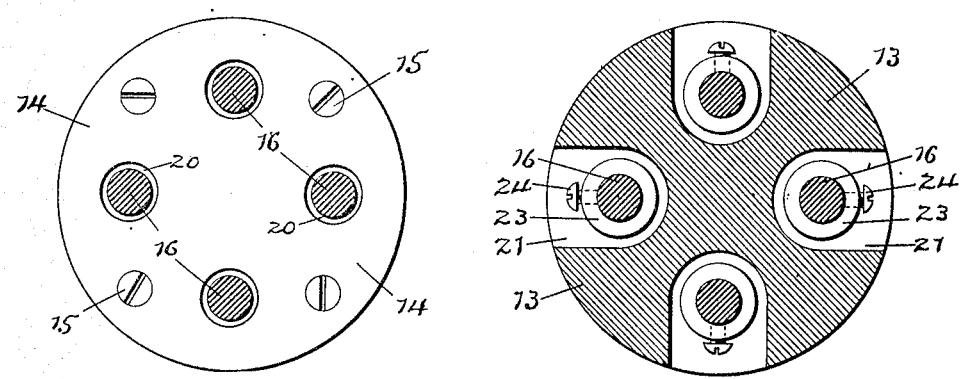
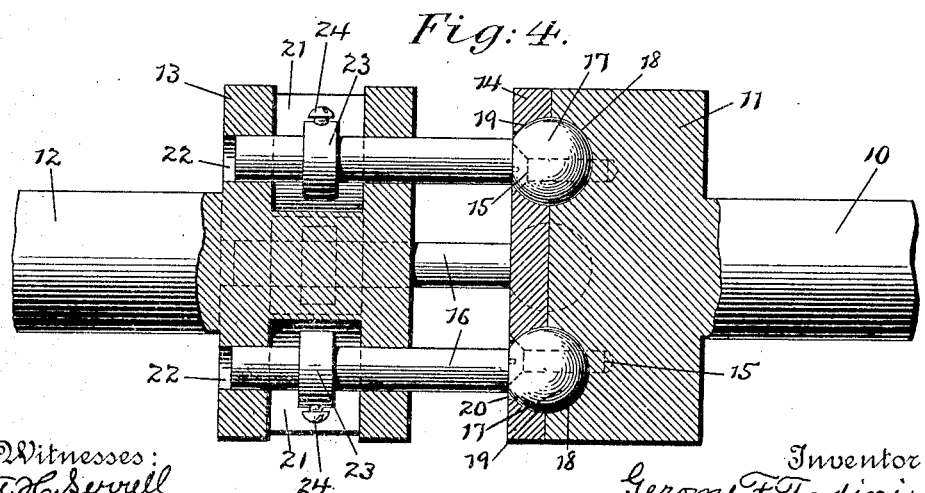
Witnesses: Inventor
Gerome F. Tadini
By his Attorney
Harold Serrell

UNITED STATES PATENT OFFICE.

GEROME F. TADINI, OF NEW YORK, N. Y.

UNIVERSAL JOINT.

No. 885,401.　　　Specification of Letters Patent.　　　Patented April 21, 1908.

Application filed November 18, 1907. Serial No. 402,576.

*To all whom it may concern:*

Be it known that I, GEROME F. TADINI, a citizen of the United States, residing at the borough of Manhattan, in the city, county, and State of New York, have invented an Improvement in Universal Joints, of which the following is a specification.

My invention relates to a universal joint, and the object thereof is the provision of a universal joint or shaft coupling in which there is approximately no dead center point.

In carrying out the invention, I employ a drive shaft, a head therefor, a driven shaft, a head for the said driven shaft, a series of rods each secured at one end in one of the said heads and adapted to swing therein, and at the other end to pass through and to be slidable in the other of said heads, and means in conjunction with the slidable or free end of each of the said rods to limit the slidable movement thereof and to prevent the same from becoming displaced in the head in which it slides, all of which will be hereinafter more particularly described.

In the drawing, Figure 1 is an elevation of my improved universal joint. Fig. 2 is a section on line x, x, Fig. 1, looking in the direction of the arrow. Fig. 3 is a section on line y, y, Fig. 1, looking in the direction of the arrow, and Fig. 4 is a central longitudinal section of the parts as shown in Fig. 1.

In carrying out my invention, and as illustrated in the drawing, I employ a drive shaft indicated at 10, provided at one end with a suitable head 11. I also employ a driven shaft indicated at 12, which is provided at the end thereof with a head 13 and on the face of the head 11 a plate 14 is secured by means of screws 15 or otherwise. I also employ a series of rods indicated at 16 and each of which preferably comprises an elongated cylindrical body portion which at one extremity is provided with a ball end 17. The face of the head 11 is provided with semi-circular recesses indicated at 18 and the plate 14 with a corresponding number of recesses 19 corresponding in curvature with the recesses 18, there being apertures 20 through the plate 14 leading into each of the recesses 19 therein, the said recesses 18 and the recesses 19 and their apertures 20 preferably being in equidistant spaced positions in the said head 11 and plate 14, and each of which is adapted to receive the ball end 17, the rod 16 thereof as will be understood, extending through an aperture 20 in the plate 14.

Referring particularly to the head 13 on the driven shaft 12, it will be seen that the same is provided with a series of equally spaced apart radial pockets 21 and transverse bores or bearings 22, each bore 22 passing approximately centrally through one of the radial pockets 21, and as will be apparent, the transverse bores 22 are adapted to receive the rods 16 and to act as bearings for these rods in which the same may slide. Each rod 16 within the pocket 21 through which it passes, is provided with a collar 23 secured in a suitable position thereon by means of a set screw 24 or otherwise; the function of the collar 23 as will be manifest, is not only to limit the slidable movement of the rods 16 in their bearings 22 in the head 13, but also to insure the said rods from becoming displaced from said bearings.

It will be understood that while I have shown the drive shaft in alinement with the driven shaft, the latter shaft may be driven at any angle to the drive shaft within the limits of the slidable movement of the rods in the head 13, and also that while the hereinbefore described structure is generally applicable for any use to which a universal joint for shafting may be employed, it is particularly designed for use in motor vehicles.

I claim as my invention:

1. In a universal joint, a drive shaft, a head secured thereto, a driven shaft, a head secured to said driven shaft, a series of rods each secured at one end in one of said heads and adapted to swing therein and to pass into and slide in the other of said heads, and means for limiting the movement of the said rods.

2. In a universal joint, a drive shaft, a head connected thereto, a driven shaft, a head connected to said driven shaft, there being provided a series of sockets in one of the said heads and a corresponding series of radially disposed pockets and a like number of transverse bores in the other of said heads, a plurality of rods each adapted at one end to be received in one of the said sockets in one head and at the other to slide in one of the said bores and pass through one of the said pockets in the other of the said heads, and means within each of the said pockets and surrounding the rod therein for limiting the movement of the said rod.

3. In a universal joint, a drive shaft, a head connected therewith, a plate, means for securing the said plate to the outer face of the said head, there being provided a series of equally spaced sockets formed between the said head and plate, with an opening through the said plate to each socket, a driven shaft, a head therefor, there being provided a series of equally spaced bores in the last aforesaid head corresponding in number with the said sockets, a series of cylindrical rods each provided at one extremity with a ball end adapted to fit within one of the said sockets, each rod passing through the opening in said plate corresponding to the socket in which its ball end is secured, and the other end thereof sliding in one of the said bores in the said head connected to the driven shaft, and means associated with each of the said rods for limiting the slidable movement thereof.

4. In a universal joint, a drive shaft, a head connected therewith, a plate, means for securing the said plate to the outer face of the said head, there being provided a series of equally spaced sockets formed between the said head and plate, with an opening through the said plate to each socket, a driven shaft, a head connected to said driven shaft, there being provided in the last aforesaid head a series of equally spaced radially disposed pockets and a corresponding number of transverse bores, each of said bores passing approximately centrally through one of the said pockets, a series of rods, there being a ball end at one extremity of each rod adapted to be secured within one of the said sockets in the head connected with the drive shaft, each of said rods passing through an opening in the said plate corresponding to the socket in which the ball end of the rod is secured, the other end of each of said rods being adapted to fit into and slide within one of the said bores in the head connected to the driven shaft and to pass through a pocket in the last aforesaid head, a collar surrounding each of the said rods within its pocket and a set-screw for securing each collar in position on its rod.

Signed by me this 17th day of October, 1907.

GEROME F. TADINI.

Witnesses:
GEO. T. PINCKNEY,
E. ZACHARIASEN.